Patented July 28, 1925.

1,547,666

UNITED STATES PATENT OFFICE.

GREENLEAF WHITTIER PICKARD, OF NEWTON CENTER, AND WALTER J. HENRY, OF JAMAICA PLAIN, MASSACHUSETTS, ASSIGNORS TO WIRELESS SPECIALTY APPARATUS COMPANY, OF BOSTON, MASSACHUSETTS, A CORPORATION OF NEW YORK.

INDUSTRIAL COMPOSITION AND PROCESS.

No Drawing. Application filed January 30, 1922. Serial No. 532,838.

*To all whom it may concern:*

Be it known that we, GREENLEAF WHITTIER PICKARD and WALTER J. HENRY, citizens of the United States, residing, respectively, at Newton Center and Jamaica Plain, Massachusetts, have Invented Industrial Compositions and Processes, of which the following description is a specification.

This invention relates to an industrial composition and process therefor.

The object of our invention is an industrial composition which shall be of low cost, hard, tough, sectile, durable, non-porous, non-absorbent, an electric insulator, not readily inflammable, and also adapted to contain a coloring matter, if desired, without injuriously affecting the material.

The invention consists of the composition of matter and process therefor described herein and defined in the claims.

Our composition comprises sulfur and asbestos fibers (the sulfur content being relatively quite small and the asbestos content quite large), preferably and usually without a substantial proportion of anything else (save for the coloring matter sometimes desirable), because we have found that the addition of substantial quantities of various other materials usually affects deleteriously the desired strength of the composition.

The composition in its preferred form (when not artificially colored) has a drab color not much different from the color of the crude asbestos rock as mined, showing no yellow color or other appearance of sulfur, although, if desired, it may be made to show surface spots of sulfur color to constitute an appearance resembling certain kinds of marble for decorative purposes. Unlike the crude asbestos rock, however, the fibers in the composition are not visible. This product is a hard and very strong solid, looking something like soapstone, but actually very tough and not at all brittle. The material is so strong that even thin pieces of it can stand rough treatment without breakage like pieces of metal of corresponding shapes; and the composition can readily be machined like a metal, although it is preferably shaped by pressure-molding in manufacturing the composition itself.

The proportions of the sulfur and asbestos-like material or fibers in the composition are generally approximately by weight one part or slightly less of sulfur and four parts or slightly more of asbestos. In general, the smaller the sulfur content and therefore the larger the asbestos content, the greater will be the strength and other desired properties of the composition.

The process of making the composition consists in subjecting a loose mass of the asbestos fibers to a high mechanical pressure (preferably of the order of thousands of pounds per square inch of the surface of the fibrous mass) in the presence of the small proportion of sulfur in a molten (limpid or viscous) state, and in solidifying the sulfur while such pressure is maintained, that is, maintaining such pressure until the sulfur is solidified. The fibers and the sulfur preferably are mixed together before being subjected to the high pressure.

The process preferably and usually involves the initial use of a somewhat greater proportion of sulfur than that specified above for the final product, which excess is squeezed out of the mass during the compressing process, the initial proportions for the process being about one part or slightly more of sulfur to three parts or slightly less of asbestos.

The form in which the asbestos is used in the process is a loose flocculent mass of fine fibers (the fibers being preferably short), known commercially as short-fibered asbestos, and more specifically under the name "No. 60 Johns-Manville" asbestos. (Longer fibers may be used, however, such as the asbestos known commercially as long-fibered asbestos). The loose mass of fibers is the result of some preliminary treatment of the crude asbestos rock as mined, such as crushing, and a further treatment of the nature of shredding, resulting in producing the fine fibers; and also preferably a selecting process for separating the longer and shorter fibers from one another. We have obtained the most homogeneous product by using short-fibered asbestos having an average length of fibers of about one-eighth of an inch or less.

The sulfur for use in the process may be ordinary commercially pure sulfur.

The first step in the process as we have used it consists in a mixing of the loose mass of asbestos fibers with the sulfur (preliminary to the compressing operation), in the stated proportions of about three or slightly less parts of asbestos to one part or slightly more of sulfur. This preliminary mixing step preferably is executed after the loose mass of asbestos fibers has been spread out in a thin layer on the surface of a steam-heated table at 350° F. more or less, whereby the aggregation of fibers is heated and moisture driven therefrom before the application of the sulfur thereto.

The preliminary mixing may be introduced by sprinkling the sulfur in pulverized form over and upon the mass of asbestos fibers, or by pouring or sprinkling molten sulfur upon the mass. Then the two ingredients are mixed together by stirring or raking, during which operation the particles of sulfur, if applied in powdered form, may assume a molten condition due to the heat from the table, and be distributed more or less throughout the aggregation of fibers; or the sulfur, if applied in molten condition, may be distributed or mixed with the fibers by the stirring or raking referred to.

The stirred mixture then is scooped up and placed in the lower member of an ordinary pressure mold (shaped internally in accord with the desired shape of the final product), the upper or plunger member of the mold being then inserted in the lower member of the mold above the mixture. Both mold members are heated to 350° F., more or less, before contact with the mixture. The normal clearance of the parts of such ordinary pressure-mold permits leakage of excess sulfur upon application of the pressure, i. e., permits squeezing of excess sulfur from the mass.

The hot mold containing the mixture then is placed in an ordinary hydraulic press, preferably capable of exerting a pressure of about 3,000 pounds per square inch upon the surface of the mixture in the mold. (We have used an hydraulic press exerting a pressure of approximately 75 tons in making articles of our composition having a cross section of between ten and twenty square inches.)

The mass of fibers in the mineral rock shows but little strength, i. e., resistance to cleavage parallel to the fibers. Sulfur in appreciable thickness also has little strength, due to shrinkage cracks. Yet our composition has great strength. Part of such strength is believed to be due to the distribution of the fibers' high tensile strength throughout the mass, whereby the various fibers lie in all directions (i. e., form a felt) as distinguished from their positions of parallelism in the crude rock. We believe that the great strength of our composition is due also to the presence of a minimum quantity of sulfur (resulting from the application of high pressure), the fibers being compacted so closely together that their interstices filled with sulfur are so small that the sulfur itself in such small thicknesses possesses considerable strength, due to lack of shrinkage cracks. So far as we have observed, the higher the pressure used, the greater seems to be the mechanical strength of our composition. In cases where less mechanical strength is desired, lower pressures may be employed. Also different pressures may be employed for fibers other than asbestos which can be properly compressed by such other pressures.

The full pressure of the press is applied over the entire surface of the mixture in the mold, and this takes only a few seconds. The members of the mold serve to confine the mixture and cause it to be uniformly compressed in all directions. The operator's act of applying the pressure to the mixture occupies about five seconds, and in general is the usual operation of an hydraulic press. The pressing operation is continued until the mixture can no longer be compressed by operation of the press. During the compressing operation, all the excess sulfur is forced out of the mold before the mixture is cooled sufficiently to allow the sulfur constituent to solidify. Satisfactory leakage for such sulfur is provided by the construction and clearance of the ordinary pressure mold. This clearance, while sufficient to permit expulsion of excess sulfur from the mold, nevertheless prevents expulsion of the fibers.

During the pressing operation, the mixing of the two ingredients is believed to be and apparently is completed by a more thorough distribution of the sulfur in molten form through the mass of fibers, due to the pressing on the yielding mass through which the sulfur previously has been more or less distributed. The entire pressing operation may be assimilated to the squeezing of a partially dry sponge. As the result of the pressing operation, the final proportion of composition is produced, i. e., of about one part or slightly less of sulfur by weight and about four parts or slightly more of asbestos. That is, all the sulfur is believed to have been squeezed out save that which just fills the interstices between the fibers of the compact mass, the size of the interstices in any given case being dependent upon the pressure applied in addition to the character of the ingredients.

But the final composition is retained in the mold under the full pressure of the press on it until the temperature of the previously-heated mold and the mixture is well below the melting point of sulfur (about 248° F.), i. e., until the sulfur has solidified. For molded articles occupying a few cubic inches, the cooling occupies about five minutes (in cases here being described where the press itself is not heated), the time being longer for articles of larger volume. The press then is released and the mold and solidified mixture are removed.

The mold is then opened, and the product removed without any difficulty of adherence of the composition to the mold; although slight preliminary greasing of the mold seems to facilitate removal of the product.

The press in the above process is cooled as by water circulation (the preferred method), and the time of applying the pressure is short, in order to complete the pressing before the sulfur has solidified.

An alternative but slower and therefore more expensive manner of applying the pressure may involve two successive pressings in two presses, the first one heated to about the same temperature as the mold, as by the use of steam under pressure in the circulating pipes, instead of cold water, and the second press cold. The mold with the mixture may be removed from such hot press after compression, then quickly transferred to the second or cold press, and again subjected to the same pressure as in the first press, and such pressure maintained until the sulfur solidifies. In any case, if desired to hasten the cooling operation, the mold containing the mixture may be subjected to water cooling without injury to the product; as indeed is done indirectly in the single press operation first above described, where the press itself (in contact with the mold) is kept cool by a water-circulating system in addition to the water which operates the press.

The above-described mixing of the two ingredients before the pressure-molding may be modified by mixing the two ingredients directly in the hot mold itself, instead of in a layer on the hot table top.

The mixing also may be modified by the addition to the mechanical mixing, of an operation for forming the mixture into sheets which while hot and yet plastic may be cut up into desired sizes for introduction into the pressing mold. This operation of sheeting may be effected by raising the temperature of the mixture to such point as to convert the sulfur (or at least a greater portion of it) into its viscous state, and (preferably thereafter) while maintaining such condition forming the sheets (as by hot rolling or pressing) of the desired thickness for use in the pressure molding. This sheeting operation facilitates the preparation of the mixture in suitable quantity for introduction into the pressure-mold; and enables us to place the hot mixture in suitable quantity into a cold mold which is placed immediately in a cold press and there compressed before the sulfur solidifies. The viscous condition of the sulfur in the mixture is one which maintains the mixture in plastic form for a sufficient time to permit cutting a portion of the sheet for the mold and placing it in the cold mold, so that the final product solidifies much more quickly after compression in the pressure mold.

Other methods of mixing the two ingredients may be used, such as exposing a mass of the loose fibrous material to sulfur vapor and allowing the latter to condense on the fibers, thereby securing a very uniform distribution of the sulfur. This may be done by placing the solid sulfur at the bottom of a closed vessel, the upper part of which is filled with the loose fibrous material, and then heating the sulfur until it vaporizes or sublimes in the closed vessel, thereby coating the fibers of the material with a thin solid sulfur film. This stock may be kept ready for use when it may be placed in the pressing mold, preferably after first being heated as on a hot table to heat the sulfur film as before.

Another method of mixing the two ingredients to secure a uniform mixture may consist in dropping loose masses of the fibrous material in molten sulfur in its limpid state and then, while the mixture is yet hot, wringing or pressing out a portion of the excess sulfur.

The product hereof may be manufactured by other processes than those specifically described herein.

Our composition is well adapted by its strength and tenacity to hold and retain metallic or other inserts such as are used, for example, in some forms of electric insulators (such as strain insulators) and in many other molded articles. Such inserts preferably are molded into the article by being placed in proper position in the mold surrounded by the mixture to be compressed.

The asbestos of the composition may be replaced by other materials such as slag-wool, glass-wool, and other asbestos-like materials, including organic (cellulose) fibers, such as cotton or linen fibers, fibers of sugar-cane refuse and the like; i. e., such materials as will withstand the heat of the process and impart mechanical strength to the product; but we prefer asbestos because it is fibrous and is wet by the sulfur in a molten state and therefore contributes to the production of the best composition we have produced thus far. But suitable fibrous materials are valuable in all compositions included within the invention because when subjected to pressure they form a compact felted mass without any cleavage planes.

The sulfur of the composition may be replaced by shellac, natural and synthetic gums or resins or other sulfur-like materials for the purpose of the composition; but we prefer sulfur because it contributes to the production of the best composition we have produced so far.

The product is of low cost, hard, strong, tough, sectile, durable, non-porous and non-absorbent; an excellent electric insulator, a fair heat-insulator, and adapted to be shaped preferably by the pressure molding itself for use in many articles of manufacture including the important one of electric insulators; although the product can be worked like a metal, as turned, drilled, ground, etc. The product is also not readily inflammable. It may be colored as desired by the addition of a suitable pigment such as those not affected by sulfur, i. e., chrome green, Spanish red, and the like, and this without injuriously affecting the product. The best pigments for this purpose are those which also are electric insulators, such as cinnabar, ultramarine, cadmium yellow and the like.

We claim:

1. The process which consists in mixing sulfur and asbestos fibers together in the proportion of about one part of sulfur to three parts of asbestos by weight, and subjecting the mixture to pressure of the order of thousands of pounds per square inch of surface of mixture while the sulfur is in a molten state and while excess sulfur is permitted to escape from the mixture; and maintaining the pressure on the mixture until the sulfur thereof is solidified.

2. The process which consists in mixing sulfur and short asbestos fibers together in the proportion of about one part of sulfur to three parts of asbestos by weight, and subjecting the mixture to pressure of the order of thousands of pounds per square inch of surface of mixture while the sulfur is in a molten state and while excess sulfur is permitted to escape from the mixture; and maintaining the pressure on the mixture until the sulfur thereof is solidified.

3. The composite material which consists of a compact mass of fibers of asbestos held together by about one quarter of its weight of sulfur, constituting a hard, strong material.

4. The composite material which consists of a compact mass of fibers held together by about one quarter of its weight of sulfur, constituting a hard, strong material.

5. The process of making a composition which consists in mixing a loose flocculent mass of short asbestos fibers with at least enough powdered sulfur to form a binder therefor extending throughout the mixture and subjecting the homogeneous mixture to heat to melt the sulfur and then compressing the heated mixture and maintaining it under compression while cooling, forming a hard, compact, strong mass in any desired shape, squeezing out any surplus sulfur.

6. A composition of matter comprising a relatively large proportion of strong material consisting of strong fibers and a relatively small amount of sulfur as a binder filling the interstices of the fibrous material when the mixture is compressed, said mixture being highly compressed in all directions and comprising a hard, strong, solid mass.

7. The herein-described process of making a composition of matter which consists in thoroughly mixing and heating fibrous material in finely divided state with at least sufficient sulfur to form a binder therefor and fill any remaining interstices without appreciable excess of sulfur after compression of the mixture, and then highly compressing said mixture uniformly over one end while confining the same elsewhere, while heated, to squeeze out surplus sulfur, if any, and to condense the mixture, and then cooling said mixture under high pressure to form a solid hard material containing a minimum amount of sulfur.

In testimony whereof we have signed our names to this specification.

GREENLEAF WHITTIER PICKARD.
WALTER J. HENRY.